(No Model.)
O. M. PHELPS & C. HANSON.
RUNNING GEAR FOR VEHICLES.
No. 290,104. Patented Dec. 11, 1883.
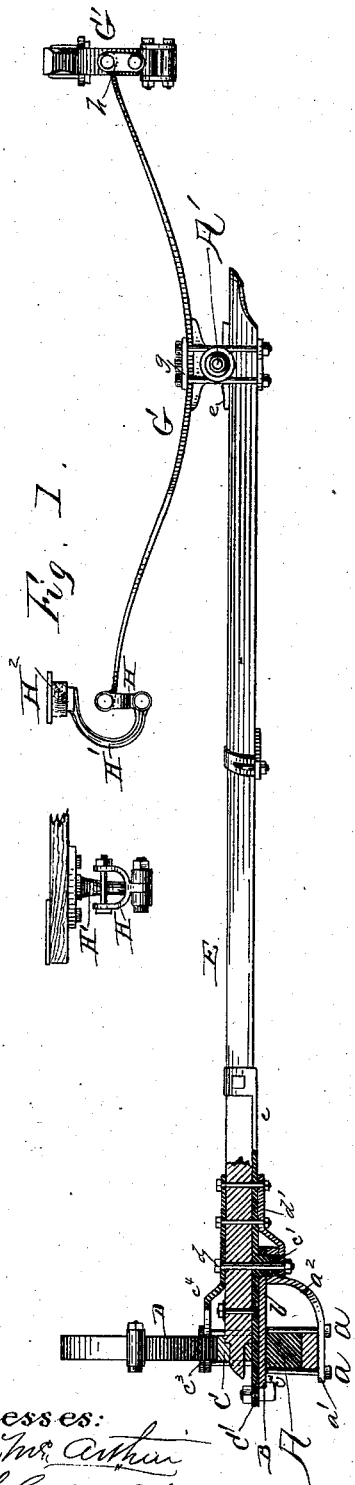
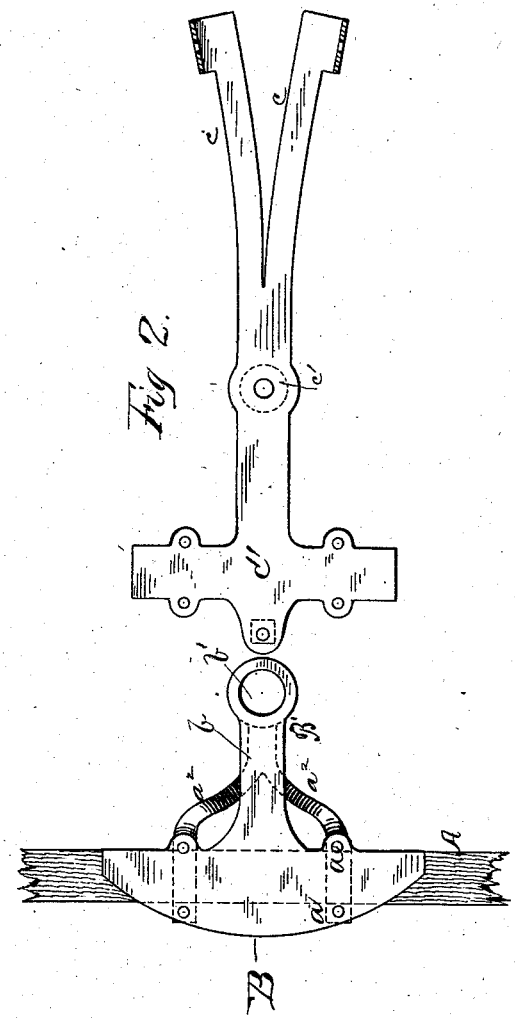
Witnesses:
Inventor:

UNITED STATES PATENT OFFICE.

OLIVER M. PHELPS AND CHRISTIAN HANSON, OF MADISON, WISCONSIN; SAID PHELPS ASSIGNOR TO JACOB A. MACK, OF SAME PLACE.

RUNNING-GEAR FOR VEHICLES.

SPECIFICATION forming part of Letters Patent No. 290,104, dated December 11, 1883.

Application filed May 22, 1883. (No model.)

*To all whom it may concern:*

Be it known that we, OLIVER M. PHELPS and CHRISTIAN HANSON, citizens of the United States, residing at Madison, in the county of Dane and State of Wisconsin, have invented certain new and useful Improvements in Platform Spring-Vehicles, of which the following is a specification, to wit:

This invention relates to an improvement in platform spring-vehicles; and it consists in certain peculiarities of construction and arrangement, whereby economy of construction, strength, lightness, and effective operation is obtained, substantially as will be hereinafter more fully described.

In order to enable others skilled in the art to which our invention appertains to make and use the same, we will now proceed to describe its construction and operation, referring to the accompanying drawings, in which—

Figure 1 is a side elevation partly in section, and Fig. 2 an enlarged detail plan, of the parts of the reach-coupling and fifth-wheel.

A represents the front and A' the rear axles of a vehicle. The front axle, A, has secured to it by bolts $a$ $a$ a plate, B, formed with a rearwardly-extending shank, $b$, in the end of which is formed a hole, $b'$, for the reception of a pivot-lug, hereinafter described. The front edge of this plate is curved upon a circle struck from the center of the hole $b'$. The clip-plates $a'$, through which the bolts $a$ $a$ pass, are extended rearward and upward to form braces $a^2$, the ends of which are joined and formed with a hole or socket, which lies just beneath the hole $b'$ in the arm of the plate B, as clearly seen in Figs. 1 and 2.

To the forward end of the reach is secured a cross-bar, C, in the usual way, and to the under side is clipped a T-headed plate, C', as seen in Figs. 1 and 2. This plate is bolted to the forward end of the reach and has its rear end forked, as seen at $c$ $c$, the ends of which follow out beneath the two arms of the reach and are clipped thereto at their ends. The under side of this plate C' is provided with a stud, $c'$, upon which the plate B and braces $a^2$ are swiveled. The forward end of this T-headed plate C' is provided with a flanged projection, $c^2$, which clasps the curved edge of the plate B and secures the parts together and guides them in turning.

Upon the top of the cross-bar C is the spring D, secured by the clip-irons $c^3$ and a brace, $c^4$, the end of which is bolted to the reach by the king-bolt $d$, which passes down through the stud $c'$, and by the other bolts, which secure the plate C' in place. The plate B and braces $a^2$ are held in place upon the stud by a cap-brace, $d'$, which is bolted to the reach and secured to the stud by the king-bolt $d$. The coupling is extremely simple and not liable to get out of order, and at the same time is strong and durable.

Having thus fully described our invention, what we claim as new, and desire to secure by Letters Patent, is—

In a reach-coupling, the axle A, having the plate B, with socketed shank B', and curved front edge and forked brace $a^2$, in combination with the reach E, having T-headed plate C', forked at its rear end and provided with a flanged projection on its forward end, and formed with the stud $c'$, brace $c^4$, king-bolt $d$, and cap-brace $d'$, all constructed and arranged to operate substantially as shown and described.

In testimony whereof we affix our signatures in presence of two witnesses.

OLIVER M. PHELPS.
CHRISTIAN HANSON.

Witnesses:
WM. H. ROGERS,
F. W. HALL.